A. M. BLACKWELL.

BUFFET SERVER.

APPLICATION FILED SEPT. 13, 1913.

Reissued Nov. 17, 1914.

13,825.

Witnesses:

Jas. E. Hutchinson:

H. N. Ramsey

Inventor:

By Adelaide M. Blackwell,

McManus & Lans Attorneys.

THE NORRIS PETERS CO., PHOTO-LITHO., WASHINGTON, D. C.

UNITED STATES PATENT OFFICE.

ADELAIDE M. BLACKWELL, OF SEATTLE, WASHINGTON.

BUFFET-SERVER.

13,825. Specification of Reissued Letters Patent. Reissued Nov. 17, 1914.

Original No. 1,063,321, dated June 3, 1913, Serial No. 680,255. Application for reissue filed September 13, 1913. Serial No. 789,713.

*To all whom it may concern:*

Be it known that I, ADELAIDE M. BLACKWELL, a citizen of the United States, residing at Seattle, in the county of King and State of Washington, have invented certain new and useful Improvements in Buffet-Servers, of which the following is a specification, reference being had therein to the the accompanying drawing.

This invention relates to improvements in devices designed particularly for use in serving buffet luncheons.

The primary object of the invention is the provision of a device which may be properly styled a buffet service comprising the combination of the plate and an improved attachment therefor designed to support a cup.

Probably the most striking disadvantage of serving guests in buffet fashion is the inconvenience and at times impossibility of properly holding or supporting a cup in connection with the ordinary plate, which latter is of course of relatively small size. This objection is entirely eliminated by me in the construction above suggested, where the plate may be held in one hand as shown and the cup in turn supported by the plate itself, leaving the other hand free for use at the will of the user.

Detail characteristics of the invention will be apparent from the specific description hereinafter contained when read in connection with the accompanying drawings forming part hereof and wherein several preferred embodiments of the invention are illustrated, and each of which embodiments embraces common features rendering the several devices simple, cheap and practical for the purpose for which they are intended.

Figure 1:
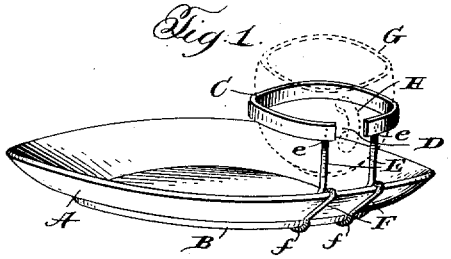
Figure 2:
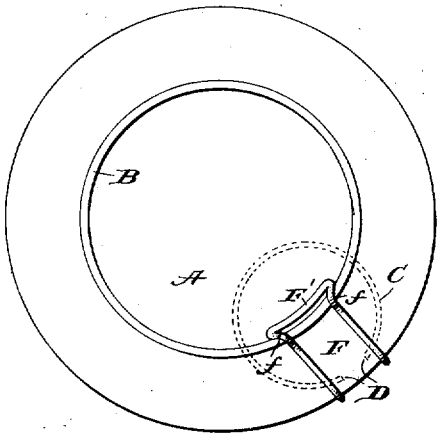
Figure 5:
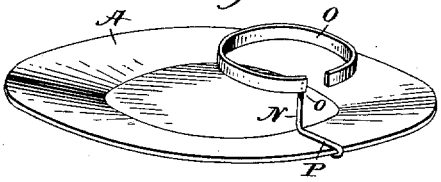
Figure 6:
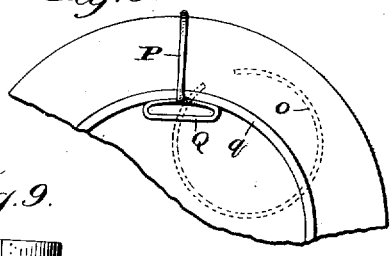

In the drawings: Figure 1 is a perspective view of one form of attachment properly applied in position on a plate to receive a cup of a conventional type, the latter being shown in dotted lines. Fig. 2 is a bottom view of Fig. 1, Figs. 3 and 4 are views corresponding to the first two figures illustrative of a second form of device, Figs. 5 and 6 are similar views of still another form of device, and Figs. 7, 8 and 9 are fragmentary vertical sectional views of the three devices above referred to illustrating somewhat more clearly the direct engagement of the several attachments with their plates.

Figure 7:
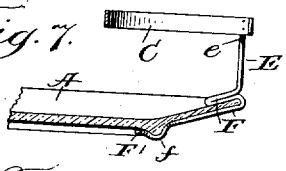

Referring more especially to the drawings wherein like reference characters, designate corresponding parts in the several series of views, and first with reference to Figs. 1, 2 and 7, A represents a plate having the usual inclined rim and bottom supporting ring or bead B. C is an approximately circular support, the same comprising conveniently a flat sheet metal spring band split and separated at its rear to afford an opening D. The supporting ring is designed to occupy a plane parallel to the plant of the bottom of the plate so as to occupy a proper horizontal position. The support for the ring is arranged so that the ring will be projected inwardly over the plate and consists in the present instance of two vertical legs or uprights E fastened to and depending from the terminal portions of the supporting ring C, as indicated at *e*, the lower ends of the uprights or legs being provided with spring feet F, formed by bending the metal upon itself to constitute a clip adapted to receive the flange of the plate therein, the angular relation of the clip to the uprights being such that the latter are given a true vertical position notwithstanding the inclination of the plate flange. While the frictional engagement of the feet with the flange of the plate in many cases will be found sufficient,—and the invention includes such a structure,—I have deemed it well to provide a lock to insure against accidental displacement or removal of the attachment from the plate, the latter including a base connecting portion F for the spring feet, offset therefrom, as at *f*, to accommodate the base ring or bead B of the plate, so that the connecting portion or the head F will interlock with the bead, as clearly shown in Fig. 7.

From the foregoing construction it will be appreciated that when the attachment is properly applied to the plate, the former may readily receive and support a cup, represented at G, with the handle H thereof projecting outwardly through the space D in the supporting ring C marginally of the plate in convenient access of the user. The overhanging position of the ring and cup, incident to the weight thereof, assists in the maintenance of the several parts in operative association.

Figure 3:
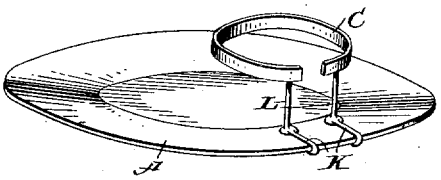
Figure 4:
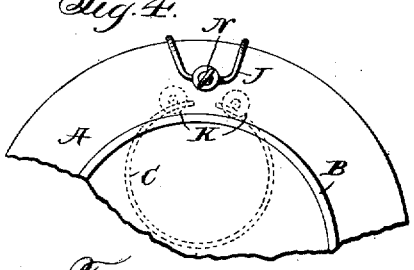
Figure 8:
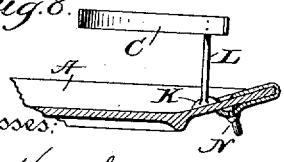
Figure 9:
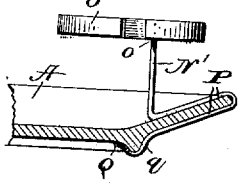

In Figs. 3, 4 and 8, I have illustrated a device quite similar to that of the figures just described, but in lieu of the lock head or base portion F, previously referred to, the locking means in this instance comprising a connecting base portion J adapted to immediately underlie the rim of the plate in opposition to flattened or disk like portions K at the lower ends of the supporting uprights L, adapted to rest upon the upper surface of the rim, a thumb screw N having threaded engagement with the connecting portion J and impinging against the rim to lock the attachment on the plate.

Referring now to the remaining figures of the drawing, to wit, Figs. 5, 6 and 9, I therein disclose a form of device wherein but a single upright or leg N′, connected to one terminal of the split supported ring O, as at *o*, alone supports the ring, the leg or upright being provided with a spring foot P similar to the feet of the form first herein described, terminating in an offset base portion or head Q engaging the bottom of the plate, beyond the bead or flange *q* thereof to interlock with the bead, as clearly shown in Fig. 9.

From the disclosures herein imparted, it will be apparent to those skilled in the art that although the invention has been shown as embodied in several forms and devices the same is not limited thereto but may be embodied in still other forms without departing from the spirit of the invention. It will also be understood that the uses to which the plate and cup herein referred to can be put are immaterial, the device being serviceable throughout a large field of usefulness. For example, it will be apparent that where, herein, I have specifically referred to a a "plate" and to a "cup," the latter will contemplate any equivalent receptacle or device, and the former will embrace not only a plate as technically known, but any suitable supporting base or member, in connection with which my improved attachment may be employed.

I claim:

1. A cup support or attachment of the character described comprising a supporting standard adapted to be secured to and project upwardly from the rim of a plate and provided with an inwardly turned cup engaging portion adapted to overhang the plate and formed to receive the bowl of the cup, the cup engaging portion comprising a ring formed with an open portion to accommodate a lateral cup handle.

2. An attachment of the character described comprising a cup engaging ring provided with an open portion, a pair of supports connected to the terminals of the supporting ring, and means for securing the supports to the rim of a plate, said last mentioned means including a part formed to embrace the rim of the plate and connecting the standards together.

3. A cup supporting attachment of the character described having a base, a supporting standard projecting upwardly from said base, and a cup engaging ring at the upper end of the supporting standard adapted to support a cup and having an outwardly disposed opening to accommodate a cup handle.

4. A cup support of the character described comprising a supporting standard formed at its lower end to removably engage the rim of a plate to secure the standard in an upright position thereon, said standard being provided with an approximately horizontally offset cup-engaging portion arranged to overhang the plate near the marginal portion thereof and adapted to substantially encompass the bowl of the cup circumferentially thereof and constitute a seat for engagement with the sides of the bowl while permitting the bottom of the cup to freely suspend therebelow, said cup-engaging portion being formed to afford an open space to accommodate a lateral cup handle, substantially as described.

5. A cup support of the character described comprising a two-part supporting standard formed at the lower portions thereof to removably engage the rim of a plate to secure the standard in an upright position thereon, said standard being provided with an approximately horizontally offset cup-engaging portion arranged to overhang the plate near the marginal portion thereof and adapted to substantially encompass the bowl of the cup circumferentially thereof and constitute a seat for engagement with the sides of the bowl while permitting the bottom of the cup to freely suspend therebelow, said cup-engaging portion being formed to terminate adjacent to the upper ends of the two members of the standard to leave an unobstructed space therebetween and between the standard members for the accommodation of a vertically disposed laterally projecting cup handle.

6. A cup support of the character described comprising a supporting standard formed at its lower end to removably engage the rim of a plate to secure the standard in an upright position thereon, said standard being provided with an approximately horizontally offset cup-engaging portion arranged to overhang the plate near the marginal portion thereof, said supporting standard and its rim-engaging portion being formed of metal bent to closely overlie and underlie the edge portion of the plate rim projecting therebetween and grip the same and bent at the terminal of the underlying part to receive the bottom bead of the plate, substantially as described.

In witness whereof I affix my signature in the presence of two witnesses.

ADELAIDE M. BLACKWELL.

Witnesses:

F. L. GWINN,

MARY HAZEL ALLEN.

Copies of this patent may be obtained for five cents each, by addressing the "Commissioner of Patents, Washington, D. C."